Jan. 21, 1964
G. H. FATHAUER
3,118,302
FUEL CONSUMPTION INDICATOR
Filed July 23, 1962
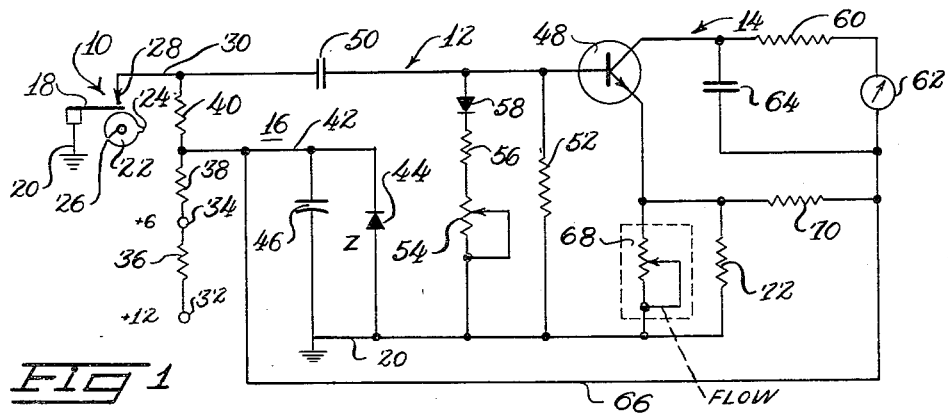
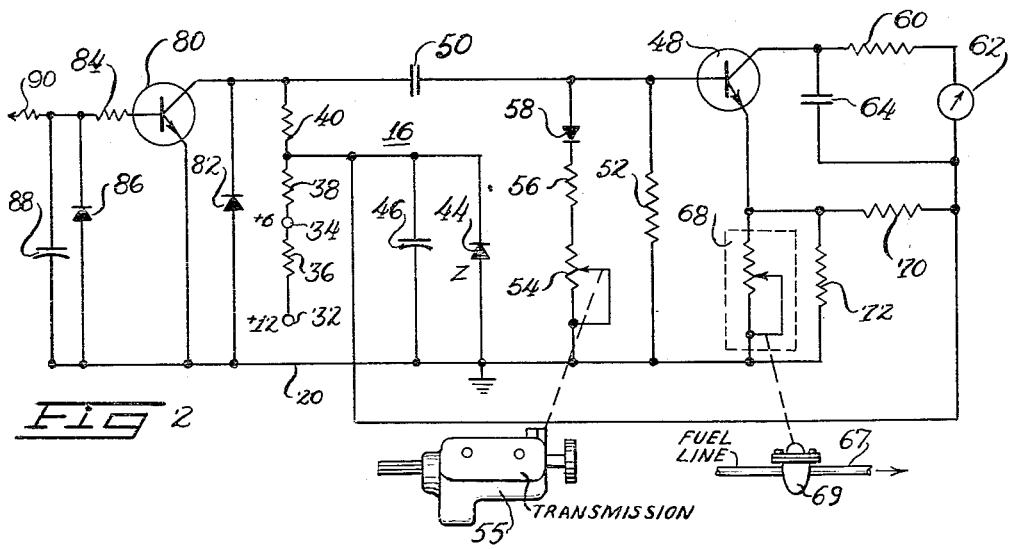
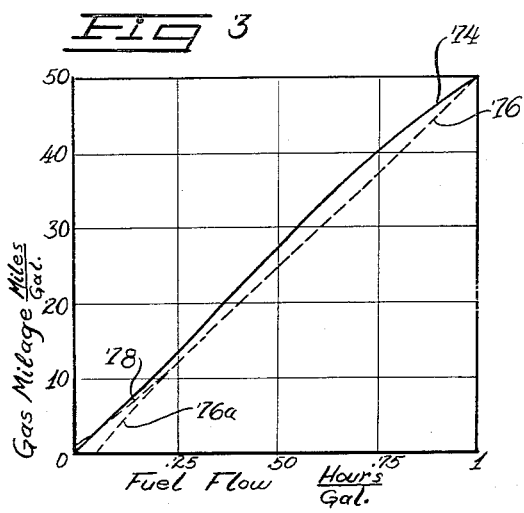
INVENTOR.
George H. Fathauer
BY
Olson, Mecklenburger, von Holst
Pendleton & Neuman Attys United States Patent Office 3,118,302
Patented Jan. 21, 1964

3,118,302
FUEL CONSUMPTION INDICATOR
George H. Fathauer, Decatur, Ill., assignor to Radson Engineering Corporation, Macon, Ill., a corporation of Illinois
Filed July 23, 1962, Ser. No. 211,735
8 Claims. (Cl. 73—114)

This invention relates to a fuel consumption or fuel efficiency indicator and in one particular instance relates to an improved fuel consumption indicator especially adapted for motor vehicles and indicating directly the instantaneous fuel consumption or fuel efficiency in miles-per-gallon.

Information concerning fuel efficiency is important in the operation of all fuel consuming moving bodies. Knowing the movement of a body for a very small unit of fuel consumed, it is possible to quickly and easily determine optimum operating speeds, gear ratios for maximum efficiency, the effect of different types of loads, the effects of various atmospheric or ambient conditions, and many other important characteristics and parameters.

While knowledge of the total distance traveled or total movement over a relatively long period of time, and the amount of fuel consumed over that same period of time, enables one to determine the average rate of fuel consumption over the entire time interval, this information is very limited in its usefulness. During the time interval many conditions may have changed and this obscures important information which can be determined only from data taken during extremely short time intervals or instantaneously.

One area in which information of instantaneous fuel consumption is valuable is in the operation of motor vehicles. While it is quite common to determine automotive fuel consumption in miles-per-gallon, the calculation is almost universally based upon the consumption of a metered amount of fuel during a measured trip. Such a calculation includes all of the variables and errors mentioned above, and is consequently only a crude indication of actual operating conditions. An instantaneous indication of fuel consumption will provide important additional information concerning fuel efficiency in each gear ratio, the effects of grades and nonlinear vehicle paths on efficiency, the effects of atmospheric conditions, and the significance of engine speed on fuel efficiency under actual road conditions.

Thus it is one important object of this invention to provide apparatus for indicating, recording, or making available data on the instantaneous fuel consumption or fuel efficiency of a fuel consuming moving body.

It is another object of this invention to provide apparatus for indicating the instantaneous fuel consumption of a fuel consuming movable body by measuring the rate of movement of said body and the rate of flow of said fuel and computing a ratio thereof.

Another object of the invention is to provide a simple, rugged and automatic device for indicating the instantaneous value of fuel consumption in automotive vehicles.

Still another object of the invention is to provide an inexpensive yet accurate device adapted to generate an electrical analog of fuel consumption in units of fuel per unit of time, generate an electrical analog of units of distance per unit of time, and accurately combine said electrical analogs to generate an indication of units of distance per unit of fuel.

It is still another object of this invention to provide improved apparatus for indicating fuel consumption in automotive vehicles employing a gating circuit whereby pulse data related to instantaneous vehicle rate is stored as a voltage in a computer network and applied to an impedance which is an analog of fuel consumption rate whereby the current through the analog impedance is a ratio of the stored voltage to the analog impedance and is a direct indication of fuel consumption in miles-per-gallon.

It is another object of this invention to provide an improved system for indicating fuel consumption wherein the circuit thereof is automatically compensated for ambient variables and particularly variables in temperature.

A further object of this invention is the provision of a simple regulated voltage source associated with an automotive fuel consumption indicator whereby the entire indicator can be housed in a single compact unit.

Another object of this invention is the provision of a fuel consumption indicator which is capable of utilizing data from various sources and may be readily calibrated for accurate direct indication based upon the known data inputs.

Another object of the invention is the provision of a computer adapted for indicating fuel consumption instantaneously wherein a variable impedance senses the fuel flow rate and a rotating device driven from either the propeller shaft of the vehicle or the speedometer connection of the vehicle generates a series of impulses, the periodicity of which is directly related to vehicle speed.

Further and additional objects of this invention will become manifest from a consideration of this specification, the accompanying drawing and the appended claims.

In one particular embodiment of the invention a rotatable device including a cam and associated switch is inserted at the joint between the speedometer cable and speedometer of a conventional automotive vehicle. It is customary to drive the speedometer cable directly from the propeller shaft unless the rear axle of the vehicle has speed-changing capabilities, in which event the speedometer cable is driven directly from the rear axle. By rotating the cam shaft to close the switch in accordance with the rotation of the rear axle a series of substantially identical impulses can be generated which are directly representative of axle speed and consequently vehicle speed.

The switch generates impulses in a storage system energized from a regulated voltage source. The impulses are thus identical and are applied to the base of a transistor which is rendered conductive thereby to conduct a predetermined current which charges a storage capacitor. The average voltage present applied to the storage circuit is directly related to the impulse amplitude and the impulse rate. As the amplitude is maintained constant, the average voltage varies only with impulse rate and thus is directly related to the vehicle speed. In series with the transistor is a variable impedance directly associated with the fuel line and driven in such a manner that the impedance is directly related to the rate of fuel flow in gallons-per-hour. Through a simple computer circuit the impulses which have an average voltage proportional to vehicle speed are applied through the impedance which is directly related to fuel consumption in gallons-per-hour to a storage capacitor whereby the current I which flows through the indicating device from the storage capacitor is equal to the ratio E/R where E is the capacitor voltage proportional to vehicle speed and R is the magnitude of the impedance which is proportional to fuel flow rate. The resulting ratio is thus an indication of fuel consumption in distance per unit of fuel and most conventionally in miles-per-gallon.

For a more complete understanding of this invention, reference will now be made to the accompanying drawing wherein FIG. 1 illustrates one embodiment of the invention; FIG. 2 illustrates an alternate embodiment of the invention; and FIG. 3 graphically portrays the operation of the circuit and particularly certain compensating characteristics thereof.

Referring now to the drawing and more particularly to FIG. 1, an interrupter 10 is shown connected to a differentiating circuit 12, which in turn applies relatively uniform impulses to a computer circuit 14. The entire circuit is energized from a power supply 16. The interrupter 10 includes a normally open switch having a fixed contact 28 and a movable blade 18 connected to a ground bus 20. The interrupter 10 also includes a cam 22 having a single narrow lobe 24 secured to a rotatable shaft 26. The shaft 26 is driven in any convenient manner at a rate of rotation directly related to the vehicle speed.

If the system is used in conventional vehicles it is convenient to drive shaft 26 by mechanically connecting it in series between the speedometer shaft and the speedometer. This is readily accomplished by enclosing the cam 22 and shaft 26 in a small sealed housing wherein the shaft 26 engages the splined or keyed end of the speedometer cable, and is inserted into the socket of the speedometer in driving engagement. The housing for the interrupter 10 has conventional threaded couplings so that the speedometer cable is threaded to the housing and the housing in turn threaded to the speedometer with a minimum of difficulty. The switch including movable contact 18 and spaced fixed contact 28 is also enclosed within the housing and may be either grounded through the vehicle frame, in which event a single conductor 30 extends therefrom, or it may be isolated from the vehicle in which event two conductors extend therefrom for connection to the remainder of the circuit of FIG. 1.

The circuit of FIG. 1 is energized from the conventional automotive electrical supply. In most modern vehicles this is a 12 volt positive system and would thus be connected to terminal 32; in the event that a 6 volt positive system is employed the terminal 34 is utilized. If the system is a negative supply the described embodiment of the invention is altered only by reversing the various semi-conductor devices which will be explained hereinafter. The terminals 32 and 34 are connected in a series voltage divider including resistors 36, 38 and 40. Connected to intermediate resistors 38 and 40 through conductor 42 is a regulator comprising a zener diode 44 and a filter capacitor 46 of substantial size.

In one particular embodiment of the invention resistor 36 has a magnitude of 560 ohms, resistor 38 a magnitude of 330 ohms, the zener diode has a nondestructive athermal inverse breakdown voltage of approximately 4 volts, and capacitor 46 has a value of 100 mfd. Thus the voltage appearing at conductor 42 will be a regulated relatively stable voltage having a magnitude determined by the inverse breakdown voltage of diode 44 and will be in the order of 4 volts. Diode 44 and capacitor 46 are connected to the ground bus 20.

The impulses caused by the closure of contact 18 by cam 22 are applied to the base of a transistor 48 through a small shaping capacitor 50. The base of transistor 48 is connected to the ground bus 20 through a base resistor 52 and a compensating network including variable resistor 54, resistor 56 and diode 58. When switch 18 is open the capacitor 50 is charged so that the input side thereof will be at a regulated potential of approximately 4 volts. Once during each rotation of shaft 26, lobe 24 closes contact 18 against fixed contact 28, grounding the input side of capacitor 50, producing a momentary negative potential with respect to ground on the output side of capacitor 50 and consequently on the base of transistor 48. After a short interval switch contact 18 opens whereby capacitor 50 is recharged as the result of charging current flowing from the battery supply through resistor 52. Thus, during the charging period the base of transistor 48 becomes positive for a very short interval, depending upon the magnitude of the various components, and particularly the network including diode 58. The time constant of the networks for both charging and discharging are relatively short compared to the rate of rotation of shaft 26, so that the capacitor 50 is charged and discharged in a time relatively short compared to the dwell time during which lobe 24 holds contact 18 against fixed contact 28. Thus, the signal appearing at the base of transistor 48 is a series of spaced positive and negative spikes typical of the signal produced at the output of a differentiating circuit.

When the contact 18 opens and the base of transistor 48 becomes positive the diode 58 is rendered conductive and thus the resistive portion of the differentiating network comprises essentially the parallel combination of resistor 52 with resistors 54 and 56. In one typical embodiment of the invention the resistor 52 has a magnitude of 1000 ohms, resistor 54 is in the order of 100 ohms, and the resistor 56 is in the order of 120 ohms. Capacitor 50 has a value of about .47 mfd. The time constant on positive impulses is, therefore, in the order of .1 millisecond.

The collector circuit of transistor 48 includes resistor 60 in series with ammeter 62 which are in parallel with storage capacitor 64. The common terminal of meter 62 and capacitor 64 is connected to the power supply 16 through conductor 66. The emitter circuit of transistor 48 includes a variable resistor 68 connected between the emitter and ground with a compensating resistor 70 connected from the emitter to the power supply 16 through conductor 66. A second compensating resistor 72 is connected directly in parallel with the variable resistor 68. Variable resistor 68 may be any one of many known fuel flow sensors in which resistance varies with rate of flow, one typical such device being made and sold by Onarga Dynamic Industries of Columbus, Ohio. A fuel line 67 is diagrammatically shown in FIG. 2 with a float chamber 69 in the fuel line whereby the resistance 68 is mechanically varied depending upon fuel flow through line 67. Any other flow indicator producing a change of resistance related to fuel flow may obviously be substituted therefor. While the disclosed embodiment employs a resistor as the fuel flow sensor device, any variable impedance may be substituted therefor, provided only that the impedance of the device is predictably related to the rate of fuel flow and preferably the impedance increases with the fuel flow in gallons-per-hour. The capacitor 64 in the indicating circuit is relatively large. In the described embodiment it is a 100 mfd. capacitor and resistor 60 has a magnitude of approximately 2000 ohms. In that embodiment resistor 70 has a magnitude of 1500 ohms, while resistor 72 has a magnitude of 330 ohms.

Each time an impulse is generated by cam 22 so that the base of transistor 48 becomes momentarily positive, base current flows whereby the collector circuit becomes conductive charging capacitor 64 by the application of an average voltage dependent upon the shape of each impulse and the periodicity of the impulses. The impulse shape is determined by the input circuitry and thus periodicity is the only variable so that the voltage appearing across capacitor 64 is directly related to the pulse period.

The collector current in transistor 48 and consequently the total charge on capacitor 64 is dependent upon the average voltage and the value of the variable resistor 68. The current through resistor 68 is equal to the ratio of the average voltage E applied thereto and the instantaneous magnitude R of the resistor. Thus, a computation is performed whereby the ratio E/R produces a current charging capacitor 64 which is directly related to the ratio of vehicle speed to fuel flow. As the charging current for capacitor 64 is discharged through the parallel path including resistor 60 and meter 62, this same current which is proportional to fuel consumption passes through meter 62 whereby the meter deflection is directly related to fuel efficiency.

The relationship between fuel flow in hours-per-gallon and gas mileage in miles-per-gallon of the typical embodiment described above, is charted in FIG. 3. The curve 74 shown in solid lines in FIG. 3 is the normal current in the collector circuit of transistor 48 for one particular vehicle speed when the compensating resistors 70 and 72 are omitted therefrom. The particular curve 74 is one of a family of curves which represents the relationship of fuel flow to gas mileage at 50 miles-per-hour. A similar curve can be drawn for each vehicle speed and the family of curves should emanate from the origin in a fan-like manner.

It will be noted that the relationship between fuel flow and fuel efficiency for a given vehicle speed as developed in the computer is not a straight line as it should be mathematically, but is nonlinear tending to flatten at the higher efficiencies. This flattening of the efficiency curve at any given speed is the result of the internal emitter impedance of the transistor 48, a small fixed impedance in series with the variable impedance 68. Impedance 68 is inversely related to fuel efficiency in hours-per-gallon and thus at the higher efficiencies the relatively small emitter impedance becomes a significant factor in series with the variable impedance 68 which is of the same order.

It has been found that the accuracy of the fuel efficiency indicator may be improved by the addition of the resistors 70 and 72. Resistor 70 is effectively in parallel with the transistor 48 and the meter circuit and produces a current in variable resistor 68. This produces an effective positive compensating current of increasing magnitude as fuel flow and consequently the magnitude of resistor 68 decreases. The slightly increasing current reduces the emitter voltage, counteracting the normal current nonlinearity due to the internal emitter impedance. Thus, the drooping characteristic of curve 74 is straightened for the lower values of resistance in sensors 68 as indicated by broken line 76 of FIG. 3. Broken line 76 thus becomes substantially straight over a major portion of the range of the indicator. However, as the fuel flow rate in gallons-per-hour increases and the magnitude of resistance in sensor 68 thus increases, the compensating effect of resistor 70 produces a slight displacement at the lower end of curve 76. It has been found that this low efficiency displacement of curve 76A can be compensated to produce the substantially straight line calibrated relationship 78 by the inclusion of parallel resistor 72 connected directly across sensor 68. Thus, in a simple compensated one-transistor computer network it is possible to calculate fuel mileage of an automotive vehicle in miles-per-gallon with unusual accuracy.

One additional variable for which compensation is desirable is the ambient temperature variation experienced by the instant fuel efficiency computer. The characteristics of transistor 48 vary with temperature, thus tending to introduce erroneous data which is dependent upon ambient temperature. The response curve of transistor 48 tends to shift slightly with temperature to effectively produce an incrementally higher collector current for a given base voltage, and this is compensated in the instant circuit by the network including diode 58. Diode 58 is selected to have a temperature coefficient similar or identical to the coefficient of transistor 48 whereby constant output from the transistor circuit is maintained irrespective of the temperature level as a result of a corresponding reduction in input level. In a typical example this has been found to be about a 2 millivolt increase in forward voltage drop for each increase in ambient temperature of 1° C.

An alternate embodiment of the invention utilizing the principles described above is shown in FIG. 2. Therein the same indicating circuit including meter 62, resistor 60 and storage capacitor 64, is connected to the collector of transistor 48. Similarly, the same or a similar fuel flow sensor 68 is connected in the emitter circuit of transistor 48 with compensating resistors 70 and 72 associated therewith. The same input circuit including coupling capacitor 50, base resistor 52 and the series combination of diode 58, resistor 56 and variable resistor 54, is connected to the base of transistor 48. The same power supply 16 with the regulating diode 44 and capacitor 46 is employed.

The embodiment of FIG. 2 differs from FIG. 1 principally in the source of input data relating to vehicle speed. In this embodiment the information for determining vehicle speed is taken directly from the ignition system of the vehicle. The circuit for accomplishing this includes a transistor 80 having its collector connected to the capacitor 50 with a zener diode 82 connected between the collector and the ground bus 20. The emitter of transistor 80 is connected directly to ground bus 20 while the base is connected through a series base resistor 84 to a filter network including a diode 86 and capacitor 88. The input filter is connected through a resistor 90 to the distributor coil, or any other portion of the ignition system so that for each ignition impulse an impulse is applied through resistors 90 and 84 to the base of transistor 80. This transistor is rendered conductive by positive impulses whereby it effectively shorts capacitor 50 to the ground bus 20 in much the same manner as interrupter 10 described with respect to FIG. 1.

The circuit including transistor 80 is basically an engine tachometer very similar to the engine tachometer described and claimed in the co-pending application of David Fathauer, Serial No. 734,868 which is assigned to the same assignee as the instant application. As explained in the co-pending application referred to, capacitor 88 stores a portion of the ignition energy on the positive impulses so that a single positive impulse is sensed at transistor 80. Diode 86 is important to the operation of the circuit in that it removes any negative transient phenomena which might hamper the accuracy of the device or damage the transistor 80 as the result of reverse bias. It will be apparent that the circuit of FIG. 2 operates on the same principles and in the same manner described with respect to FIG. 1. However, one important distinction results from the use of an engine tachometer in place of a mechanical vehicle speed impulse generator. The engine tachometer output comprises a series of pulses, the periodicity of which is related not only to vehicle speed but also to the gear ratio between the engine and the wheels. This gear ratio is, of course, variable during the operation of most automotive vehicles and thus the circuit must be compensated therefor. This is accomplished by automatically varying the series variable resistor 54 in the network which includes diode 58 and resistor 56. In a typical automotive drive the connection between the engine and the propeller shaft is direct when the vehicle is at normal operating speeds. However, the differential provides a gear reduction in the range of 3:1 to 5:1 depending upon the design and purpose of the vehicle. The gear ratio is a known quantity and thus the resistor 54 may be adjusted to accurately indicate vehicle speed based upon the knowledge of this ratio. If it is desired to accurately indicate fuel consumption when operating in the lower gears it is necessary to include in the base network of transistor 48 a switching system which will automatically insert or remove additional resistance depending upon the gear ratio. In a typical 3-speed transmission the transmission has a low gear ratio of approximately 2.5:1 and a ratio of about 1.5:1 in second gear. These may be readily compensated through the appropriate insertion of base resistance. A typical synchromesh transmission 55 is diagrammatically illustrated in FIG. 2 with a broken line connection between the transmission and the resistor 54 indicating the automatic adjustment of the resistance value in response to changes of the gear ratio in transmission 55.

While two particular embodiments of the invention have been described in some detail it will be immediately apparent that many variations may be incorporated in the basic computer system without departing from the fundamental concepts set forth above. In particular it is contemplated that any fuel flow sensor capable of producing variations in impedance directly related to fuel flow may be incorporated in the emitter circuit of transistor 48. One particular sensor which may be employed is a magnetic float in the fuel line which will be driven by fuel flow so that it is displaced with respect to sensing coils which are wound about the outside of the fuel line. This will produce a variable inductive reactance or a variable reluctance which may be incorporated in the foregoing computer system as the variable impedance. Also various techniques for generating electrical signals related to vehicle speed in addition to the engine tachometer and speedometer actuated impulse generator will immediately occur to one skilled in the art. These include small rotary generators employing either fixed or magnetic devices.

Without further elaboration, the foregoing will so fully explain the character of my invention that others may, by applying current knowledge, readily adapt the same for use under varying conditions of service, while retaining certain features which may properly be said to constitute the essential items of novelty involved, which items are intended to be defined and secured to me by the following claims.

I claim:

1. A fuel consumption indicator for a fuel driven vehicle comprising measuring means generating a series of voltage impulses of substantially uniform character, the periodicity of said impulses being directly related to the velocity of said vehicle, energy storage means integrating said impulses to produce a voltage magnitude directly related to the periodicity of said impulses, a variable impedance inversely variable in accordance with the time rate of fuel consumption by said vehicle, means charging said energy storage means through said variable impedance by said series of voltage impulses, and indicator means discharging said energy storage means at a substantially uniform rate and indicating the distance traveled by said vehicle as a function of fuel consumption.

2. The fuel consumption indicator of claim 1 wherein said energy storage device is a large integrating capacitor, and said indicator means is an ammeter connected across said large capacitor and calibrated in distance traveled by said vehicle per unit of fuel.

3. A fuel consumption indicator for a fuel driven vehicle comprising measuring means generating a series of voltage impulses of substantially uniform character, the periodicity of said impulses being directly related to the velocity of said vehicle, gate means having said voltage impulses applied to the control element thereof, integrating capacitor means, a variable impedance inversely variable in accordance with the time rate of fuel consumption by said vehicle, a source of electrical power, said capacitor means, variable impedance, source, and the gated path of said gate means being connected in series whereby said capacitor means receives a charge directly related to said periodicity and the magnitude of said impedance, and current responsive indicator means connected to discharge said capacitor means and indicate the distance traveled as a function of fuel consumption.

4. The fuel consumption indicator of claim 3 wherein the gate means is a transistor having its base connected to said measuring means and its collector and emitter connected in the series circuit.

5. A fuel consumption indicator for a fuel driven vehicle comprising two terminal measuring means generating a series of voltage impulses of substantially uniform character, the periodicity of said impulses being directly related to the velocity of said vehicle, transistor means having base, collector, and emitter connections, one terminal of said measuring means being connected to said base connection, a variable impedance connected between said emitter connection and the other of said two terminals, said variable impedance being inversely variable in accordance with the time rate of fuel consumption by said vehicle, a source of electrical power and integrating capacitor means connected in a series circuit between said other terminal and said collector connection, and current responsive indicator means connected to discharge said capacitor means and indicate the distance traveled as a function of fuel consumption.

6. The fuel consumption indicator of claim 5 including compensating impedance means connected between said emitter connection and said source, and fixed correcting impedance means connected in parallel with said variable impedance.

7. The fuel consumption indicator of claim 5 including semiconductive diode means connected between said terminals of said measuring means and polarized for conduction in response to said voltage impulses whereby said indicator is compensated for temperature variations.

8. The fuel consumption indicator of claim 5 wherein said measuring means comprises an input low pass filter circuit gate means having an input circuit connected to said input filter, and a gated circuit, a zener diode connected across said gated circuit, a capacitor connected from one side of said gated circuit to said base connection and impedance means connected between said base connection and the other side of said gated circuit, said latter connections comprising the terminals of said measuring means.

References Cited in the file of this patent

UNITED STATES PATENTS 2,916,914   Graves et al. _____ Dec. 15, 1959